United States Patent [19]
Zhou et al.

[11] Patent Number: 6,128,257
[45] Date of Patent: Oct. 3, 2000

[54] PERSONAL COMPUTER BASED CD-ROM DISC DRIVE TABLE OF CONTENT ASSEMBLY

[75] Inventors: Ning Eric Zhou, Fremont; Steven E. Olson; Robert Griffith, both of San Jose, all of Calif.

[73] Assignee: Oak Technology, Inc., Sunnyvale, Calif.

[21] Appl. No.: 09/235,386

[22] Filed: Jan. 22, 1999

[51] Int. Cl.[7] .................................................. G11B 17/22
[52] U.S. Cl. ............................................................. 369/33
[58] Field of Search ................................ 369/33, 32, 47, 369/48, 54, 59, 58

[56] References Cited

U.S. PATENT DOCUMENTS

| | | | |
|---|---|---|---|
| 4,949,323 | 8/1990 | Yoshida | 369/32 |
| 5,325,352 | 6/1994 | Matsumoto | 369/275.1 |
| 5,666,336 | 9/1997 | Yoshida | 369/32 |
| 5,771,212 | 6/1998 | Park | 369/33 |
| 5,936,917 | 8/1999 | Min | 369/32 |

FOREIGN PATENT DOCUMENTS 8-83482  3/1996  Japan.

*Primary Examiner*—Tan Dinh
*Attorney, Agent, or Firm*—Pennie & Edmonds LLP

[57] ABSTRACT

A personal computer capable of creating a table of contents (TOC) for a CD-ROM in response to receipt of lead-in Sub-channel Q data from a CD-ROM disc drive. The personal computer includes a computer readable memory storing a first and second set of instructions. The first set of instructions implement a read lead-in command to read lead-in Sub-channel Q data of the CD-ROM in the CD-ROM disc drive. The second set of instructions create a TOC and store the TOC in the computer readable memory in response to receipt of the lead-in Sub-channel Q data from the CD-ROM disc drive.

5 Claims, 5 Drawing Sheets

Table I  Lead in Area (TOC), Sub-channel Q formats

| S0,S1 | Control/ADR | TNO | Point | Min | Sec | Frame | Zero | Pmin | PSec | PFrame |
|---|---|---|---|---|---|---|---|---|---|---|
| 2 bits | 4/6 | 1 | 00 | 01-99 | 00 (Absolute time is allowed) | | 00 | Start position of track | | |
| | 4/6 | 1 | 00 | A0 | 00 (Absolute time is allowed) | | 00 | First Track num | Disc Type | 00 |
| | 4/6 | 1 | 00 | A1 | 00 (Absolute time is allowed) | | 00 | Last Track num | 00 | 00 |
| | 4/6 | 1 | 00 | A2 | 00 (Absolute time is allowed) | | 00 | Start position of the Lead-out area | | |
| | 4/6 | 1 | 00 | B0 | Start time of next possible program in the Recordable Area of the Hybrid Disc | | # of pointers in mode 5 | Maximum start time of the outermost Lead Out area in the Recordable Area of the Hybrid Disc | | |
| | 4/6 | 5 | 00 | B1 | 00 | 00 | 00 | 00 | # of Skip Interval Pointers (N<=40) | # of Skip Track Pointers (N<=21) | 00 |
| | 4/6 | 5 | 00 | B2-B4 | Skip# | Skip# | Skip# | Skip# | Skip# | Skip# | Skip# |
| | 4/6 | 5 | 00 | 01-40 | Ending time for the interval that should be skipped | | Reserved | Start time for interval that should be skipped on playback | | |
| | 4/6 | 5 | 00 | C0 | Optimum recording power | Application Code | Reserved | Reserved | Start time of the Lead in Area of the Hybrid Disc | | |

Point            The point field defines various types of information:

01-99    Track number references
                 A0       First Track number in the area
                 A1       Last Track number in the program area
                 A2       Start location of the Lead-out area
                 B0       Used to identify a Hybrid Disc (Photo CD)
                         Contains start time of next possible program area
                 B1       Number of Skip Interval Pointers & Skip Track assignments
                 01-40    Skip Interval Pointers
                 B2-B4   Skip Track Assignment Pointers
                 C0       Start time of first Lead In area of Hybrid Disc
                         This only exists in the first Lead In area Disc Type Byte     This byte contains a definition of the type of disc 00h      CD-DA or CD-ROM with frist track in Mode 1
                 10h      CD-I disc
                 20h      CD-ROM XA disc with first track in Mode 2

*FIG. 2*
*(PRIOR ART)*

| Ses | A/C | TNO | Pnt | Min Sec Frame | Zero | PMin Psec PFrame | Comments |
|---|---|---|---|---|---|---|---|
| 01 | 14 | 00 | A0 | 00 00 00 | 00 | 01 20 00 | First track is 1. XA disc |
| 01 | 14 | 00 | A1 | 00 00 00 | 00 | 03 00 00 | Last track is 3 |
| 01 | 14 | 00 | A2 | 00 00 00 | 00 | 02 08 3F | Lead Out Area on 1st session |
| 01 | 14 | 00 | 01 | 00 00 00 | 00 | 00 02 00 | Start address of track 1 |
| 01 | 14 | 00 | 02 | 00 00 00 | 00 | 00 08 02 | Start address of track 2 |
| 01 | 14 | 00 | 03 | 00 00 00 | 00 | 00 15 32 | Start address of track 3 |
| 01 | 54 | 00 | B0 | 04 26 3F | 02 | 40 02 00 | Next recordable area address |
| 01 | 54 | 00 | C0 | C0 00 0 | 00 | 61 2C 00 | Hybrid disc |
| 02 | 14 | 00 | A0 | 00 00 00 | 00 | 04 20 00 | 1st track on 2nd session is 4 |
| 02 | 14 | 00 | A1 | 00 00 00 | 00 | 06 00 00 | Last track on 2nd session is 6 |
| 02 | 14 | 00 | A2 | 00 00 00 | 00 | 08 20 08 | Lead Out Area on 2nd session |
| 02 | 14 | 00 | 04 | 00 00 00 | 00 | 04 28 3F | Start address of track 4 |
| 02 | 14 | 00 | 05 | 00 00 00 | 00 | 04 2E 41 | Start address of track 5 |
| 02 | 14 | 00 | 06 | 00 00 00 | 00 | 06 27 36 | Start address of track 6 |
| 02 | 54 | 00 | B0 | 09 2C 08 | 01 | 40 20 00 | Next recordable area address |
| 03 | 14 | 00 | A0 | 00 00 00 | 00 | 07 20 00 | 1st track on 3rd session is 7 |
| 03 | 14 | 00 | A1 | 00 00 00 | 00 | 09 00 00 | Last track on 3rd session is 9 |
| 03 | 14 | 00 | A2 | 00 00 00 | 00 | 0C 27 32 | Lead Out Area on 3rd session |
| 03 | 14 | 00 | 07 | 00 00 00 | 00 | 09 2E 08 | Start address of track 7 |
| 03 | 14 | 00 | 08 | 00 00 00 | 00 | 09 34 10 | Start address of track 8 |
| 03 | 14 | 00 | 09 | 20 09 32 | 00 | 0B 04 24 | Start address of track 9 |
| 03 | 54 | 00 | B0 | 00 00 00 | 01 | 40 02 00 | Next recordable area address |
| 04 | 14 | 00 | A0 | 00 00 00 | 00 | 0A 20 00 | 1st track on 4th session is 10 |
| 04 | 14 | 00 | A1 | 00 00 00 | 00 | 0C 00 00 | Last track in 4th session is 12 |
| 04 | 14 | 00 | A2 | 00 00 00 | 00 | 12 1B 1A | Lead Out Area on 4th session |
| 04 | 14 | 00 | 0A | 00 00 0 | 00 | 0E 0B 32 | Start address of track 10 |
| 04 | 14 | 00 | 0B | 00 00 00 | 00 | 0E 11 34 | Start address of track 11 |
| 04 | 14 | 00 | 0C | 00 00 00 | 00 | 11 08 22 | Start address of track 12 |
| 04 | 54 | 00 | B0 | 13 39 1A | 01 | 40 20 00 | Next recordable area address |

Table II

Ses: session number
A/C: ADR/Control
TNO: 00 for Lead in Area
Pnt: POINT

FIG. 3
*(PRIOR ART)*

PERSONAL COMPUTER BASED CD-ROM DISC DRIVE TABLE OF CONTENT ASSEMBLY

FIELD OF THE INVENTION

The present invention relates to personal computer systems including CD-ROM disc drives. In particular, the present invention relates to a personal computer system including a CD-ROM disc drive that supports host based disc profile table of contents (TOC) assembly.

BACKGROUND OF THE INVENTION

FIG. 1 illustrates a typical CD-ROM disc drive 12 and personal computer 40. CD-ROM disc drive 12 reads data stored on a compact disc 14. A number of standards govern the manufacture of compact disc 14. The first standard introduced, the Compact Disc Digital Audio Standard, commonly referred to as the Red Book, defined a single type of track, audio. Subsequently, the CD-ROM Standard, known as the Yellow Book, further defined the Red Book by adding two additional types of tracks: CD-ROM Mode 1, for computer data, and CD-ROM Mode 2, for compressed audio data and video picture data.

According to the standards of the Red and Yellow Books, the recorded area of compact disc 14 is divided into three parts: lead-in area 15, program area 16, and lead-out area 17. Program area 16 is divided into tracks and may include as many as 99. A track may be thought of as a partition of CD-ROM address space. Tracks have a minimum length of 300 sectors. Multi-session CD-ROM discs include multiple sessions, each recorded at a different time and having its own lead-in, program and lead-out area.

Information stored on compact disc 14 is organized into sectors. Each sector includes 2352 bytes of information and 98 bytes of control data. The eight bits of a control byte are individually named according to the which sub-channel they represent: P, Q, R, S, T, U, V and W. Thus, all the second bits of each control byte represent the Q sub-channel, which contains the running times from the beginning of the disc and from the beginning of the current track. The Q sub-channel of lead-in area 15 is used to store information about the CD-ROM type and lay-out, information referred to as the disc's table of contents. This table of contents is continuously repeated throughout the lead-in area, with each TOC item of information repeated three times. TOC integrity requires that the assembled TOC include all TOC items, no items repeated and all items presented in their correct order.

Table I of FIG. 2 illustrates the various data formats that may be used to describe lead-in Sub-channel Q data. Within the Control/ADR byte the four bit ADR field defines the item mode, which indicates which other fields in the item are meaningful. Table II of FIG. 3 is an example of a TOC.

According to current standards a CD-ROM disc drive must assemble and store the TOC because the lead-in area, by definition, is not accessible to personal computers. Thus, to support TOC assembly CD-ROM disc drive 12 includes microcontroller 20 and memory 22. Memory 22 not only stores TOC 26, but also instructions for creating the TOC, referred to as TOC Driver 24. Under the direction of TOC Driver 24, microcontroller 20 responds to the presence of a new CD-ROM by reading the lead-in Sub-Channel Q data via Read Circuitry 18 and creating a new TOC 26, which is then stored in memory 22.

Creation of TOC 26 by CD-ROM disc drive 12 allows personal computer 40 to identify and locate the information on CD-ROM 16 by simply issuing a read command. Instructions for READ TOC command 42 form part of the disc driver instructions 44 stored within memory 45. When issued by central processing unit (CPU) 46, the signals representing the READ TOC command are conveyed via input/output (I/O) interface 47 and a I/O bus 48 to CD-ROM disc drive 12.

A disadvantage of the prior personal computer system is the computational and financial cost of disc drive based TOC assembly. Microcontroller 20 must be more sophisticated, and thus more expensive, than if TOC construction were not CD-ROM disc drive based. Similarly, the total capacity of memory 22 must be greater, and thus more expensive, than would be the case if CD-ROM disc drive 12 did not store the TOC.

SUMMARY OF THE INVENTION

The computer system of the present invention supports host based assembly of a disc table of contents (TOC). The computer system of the present invention includes a personal computer and a CD-ROM disc drive. The personal computer includes a first memory having a first memory capacity and storing a first and second set of instructions. The first set of instructions implement a read lead-in command to read lead-in Sub-channel Q data on a CD-ROM in the CD-ROM disc drive. The second set of instructions create a disc profile table of contents and store the TOC in the first memory in response to receipt of the lead-in Sub-channel Q data. The CD-ROM disc drive of the present invention responds to a command from a personal computer to read Sub-channel Q data in the lead-in area of a CD-ROM. The CD-ROM disc drive includes a microcontroller and a second memory, whose capacity is less than that of the first memory. The second memory stores a first set of microinstructions to read the lead-in Sub-channel Q data and to couple that data directly to the personal computer. The CD-ROM disc drive of the present invention does not create, nor does it store, a TOC.

An advantage of the present invention is reduced manufacturing costs resulting from use of a less sophisticated disc drive microcontroller and by use of less memory in the CD-ROM disc drive.

Another advantage of the present invention is reduced latency time between the insertion time of a CD-ROM into the CD-ROM disc drive until the data on the CD-ROM is available to a computer user because the TOC is generated by the personal computer's central processing unit (CPU). This CPU is more powerful and operates at a higher clock rate than the CD-ROM disc drive's microcontroller, allowing faster TOC creation without adversely impacting the performance of the personal computer.

Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings, similar references indicate similar elements.

FIG. 2 illustrates prior art Lead-in area Sub-channel Q formats.

FIG. 3 illustrates an exemplary TOC.

DETAILED DESCRIPTION OF THE INVENTION

Figure 1:
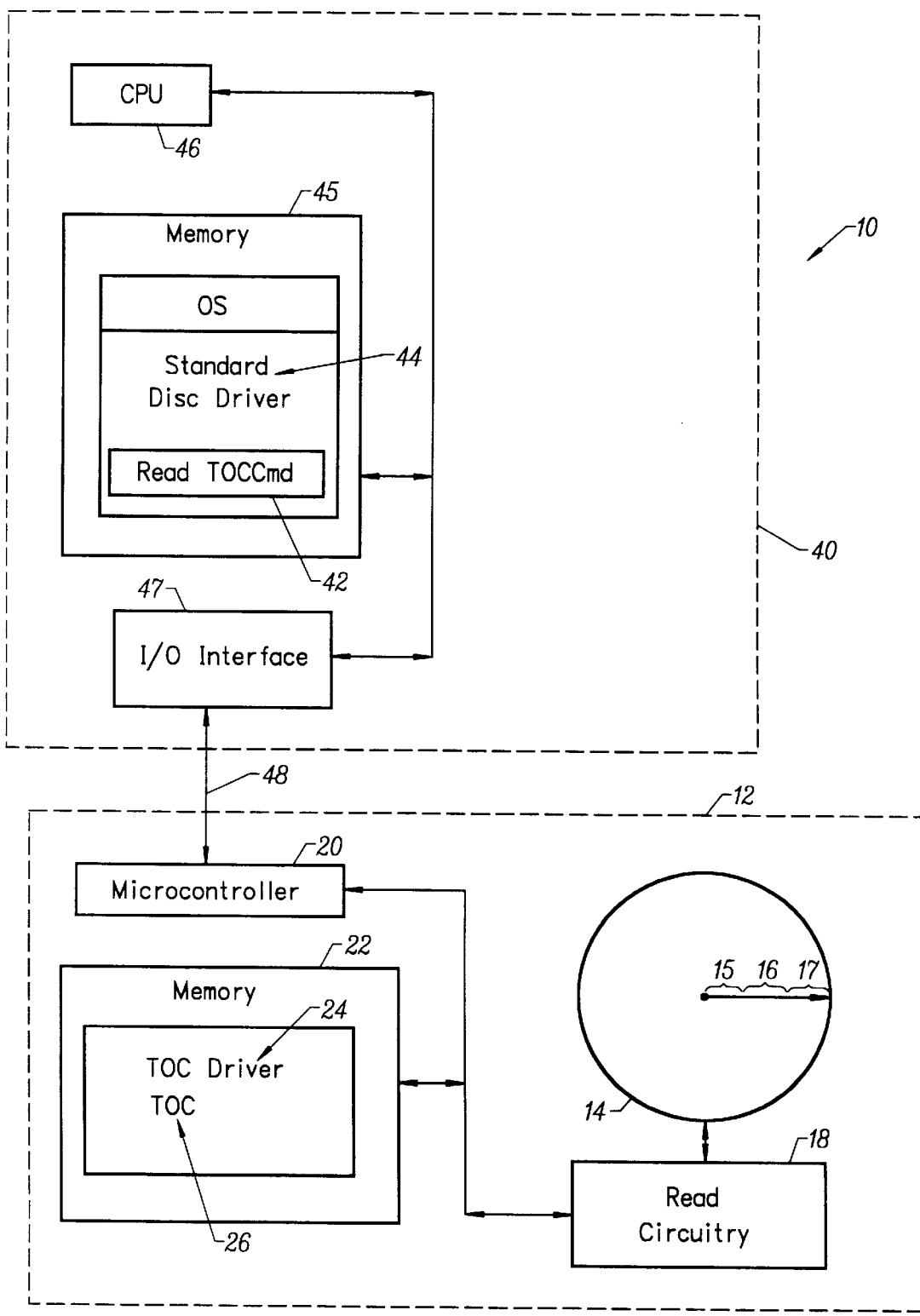
FIG. 1 illustrates a prior art CD-ROM disc drive and personal computer.
Figure 4:
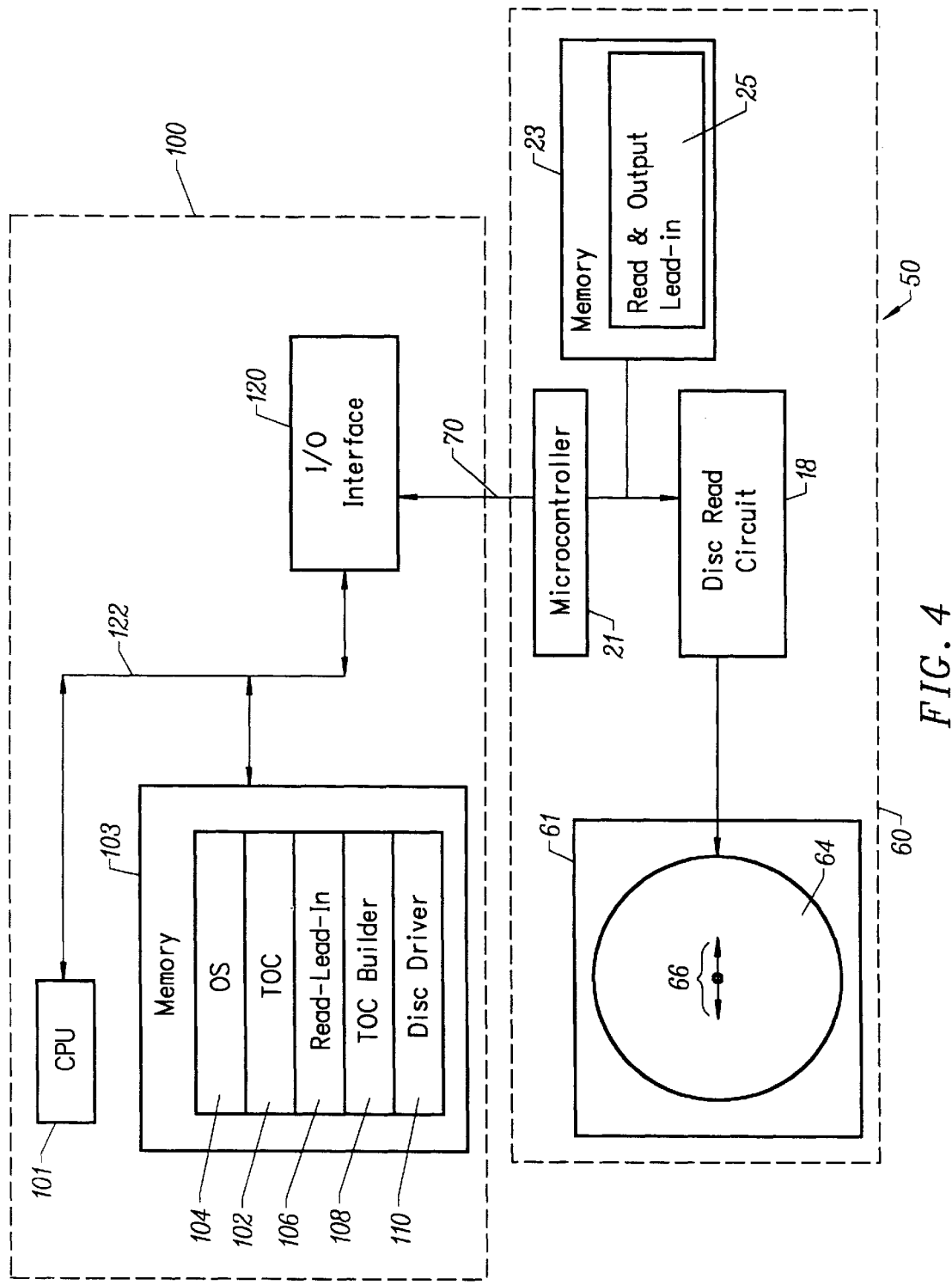
FIG. 4 illustrates a personal computer system incorporating the CD-ROM disc drive of the present invention.

FIG. 4 illustrates in block diagram form computer system 50 of the present invention. Briefly described, computer system 50 enables personal computer 100 to create and store a disc profile table of contents (TOC), freeing CD-ROM disc drive 60 of this responsibility. CD-ROM disc drive 60 includes a microcontroller 21 responsive to a Read Lead-in command from personal computer 100. Upon receipt of this command, CD-ROM disc drive 60 reads the lead-in Sub-channel Q data on a CD-ROM and then transfers it to personal computer 100, which uses it to create TOC 102. Personal computer 100 performs these tasks using instructions stored in memory 103, which include Read Lead-in module 106 and TOC Builder module 108. Read Lead-in module 106 implements a command for CD-ROM disc drive 60 to read Sub-channel Q data in lead-in area 66 and to couple that data directly to personal computer 100. TOC Builder 108 enables personal computer 100 to build a TOC from the lead-in Sub-channel Q data. As compared to prior computer systems, computer system 50 is less expensive to manufacture because microcontroller 21 is less sophisticated and less expensive than those microcontrollers of prior CD-ROM disc drives because microcontroller 21 does not create a TOC. The manufacturing costs for computer system 50 are further reduced by the reduced memory capacity of memory 23, which no longer stores a TOC.

Still referring to FIG. 4, computer system 50 includes personal computer 100, CD-ROM disc drive 60 and I/O bus 70. CD-ROM disc drive 60 includes disc read circuit 18, microcontroller, memory 23 and receptacle 61 for holding a CD-ROM 64. Unlike prior disc drive microcontroller 20, microcontroller 21 recognizes a Read Lead-in command issued by personal computer 100. Microcontroller 21 does so using microinstructions 25 stored within memory 23. In response to the Read Lead-in command, microcontroller 21 causes disc read circuit 18 to read the Sub-channel Q data within lead-in area 66 of CD-ROM 64. Microcontroller 21 then couples the lead-in Sub-channel Q data directly to input/output (I/O) bus 70. Because microcontroller 21 does not create a TOC, microcontroller 21 may be less sophisticated, and less expensive, than microcontroller 20 of prior art CD-ROM disc drive 12. Additionally, because TOC 102 is stored within memory 103 of personal computer 100, the capacity of memory 23 may be substantially less than that of memory 22 of prior art CD-ROM disc drive 12. These differences reduce the manufacturing cost of CD-ROM disc drive 60 as compared to that of CD-ROM disc drive 12.

CD-ROM disc drive 60 is coupled to personal computer 100 via I/O bus 70. I/O bus 70 couples the Read Lead-in command to CD-ROM disc drive 60 and the lead-in Sub-channel Q data to personal computer 100. I/O bus 70 may be otherwise compliant with the ATA/IDE Standard consistent with the present invention.

Personal computer 100 differs from prior PCs in that personal computer 100 builds and stores TOC 102, rather than relying upon CD-ROM disc drive 60 to do so. TOC creation does not significantly affect the performance of personal computer 100 and improves the latency time between when a CD-ROM is inserted into CD-ROM disc drive 60 and when the data on the CD-ROM disc drive is available to personal computer 100. Personal computer 100 includes central processing unit (CPU) 101, which communicates with memory 103 and I/O interface 120 via system bus 122. CPU 101 controls and coordinates the operations of computer system 50 to execute the commands of the computer user. CPU 101 determines and takes the appropriate action in response to each user command by executing instructions stored electronically in memory 103. Instructions stored within memory 103 include operating system (OS) 104, Read Lead-in module 106, TOC Builder 108 and Disc Driver 110. Disc Driver 110 implements those commands necessary to interface with CD-ROM disc drive 60 that do not relate to creation of TOC 102. Disc driver 110 differs from prior disc drivers in that it does not implement a Read TOC command.

Figure 5:
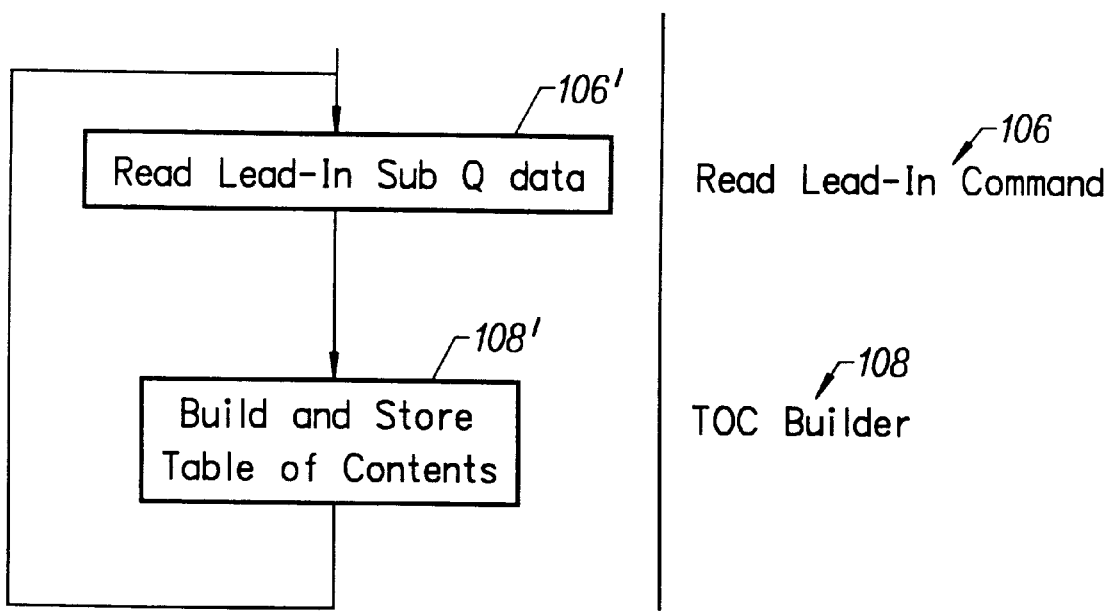
FIG. 5 illustrates the inter-relationship of the software modules of the present invention.

FIG. 5 illustrates the interaction between Read Lead-in module 106 and TOC Builder 108 and their order of execution. The text on the left hand side of FIG. 5 describes the function of each module, while the right hand side of FIG. 5 identifies the module performing that function. Upon detection of a CD-ROM within CD-ROM disc drive 60, during step 106' CPU 101 begins executing the Read Lead-In module 106 to issue a read lead-in command to CD-ROM disc drive 60. In response, CD-ROM disc drive 60 begins transmitting the Sub-channel Q data of lead-in area 66 to personal computer 100. Receipt of lead-in Sub-Channel Q data initiates execution of TOC Builder 108 by CPU 101 during step 108'. TOC Builder 108 uses the lead-in Sub-channel Q data to create TOC 102, which it stores in memory 103. TOC 102 includes the same type of information included in Table II of FIG. 3. The individual data items included within TOC 102 need not be located near one another within memory 103.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A personal computer system comprising:
   a) a CD-ROM drive to read a CD-ROM, the CD-ROM having a lead-in area including Sub-channel Q data;
   b) a processor coupled to the CD-ROM drive, the processor executing instructions; and
   c) a first computer readable memory coupled to the processor having a first memory capacity, the first computer readable memory storing:
      1) a first set of instructions to implement a read lead-in command to read the lead-in Sub-channel Q data on a CD-ROM; and
      2) a second set of instructions to create a disc profile table of contents in response to receipt of the lead-in Sub-channel Q data.

2. The personal computer system of claim 1 wherein the CD-ROM drive comprises:
   1) a microcontroller for executing microinstructions;
   2) a second computer readable memory coupled to the microcontroller, the second computer readable memory having a second memory capacity less than the first memory capacity, the second computer readable memory storing:
      A) a first set of microinstructions to read lead-in Sub-channel Q data in response to receipt of the read lead-in command and to couple the lead-in Sub-channel Q data to the processor.

3. A CD-ROM disc drive functionally compatible with a personal computer, the personal computer including a first memory having a first memory capacity, the CD-ROM disc drive comprising:
   a) a receptacle for a CD-ROM disc, the disc having a lead-in area storing data from which a disc profile table of contents is generated and stored by the personal computer; and
   b) a microcontroller for executing microinstructions;
   c) a second computer readable memory coupled to the microcontroller, the second computer readable memory having a second memory capacity less than the first memory capacity, the second computer readable memory storing:
      1) a first set of microinstructions to read lead-in Sub-channel Q data in response to receipt of the read lead-in command from the personal computer and to couple the lead-in Sub-channel Q data to the processor.

4. The CD-ROM disc drive of claim 3 wherein the first computer readable memory stores:
   1) a first set of instructions to implement the read lead-in command;
   2) a second set of instructions to create the disc profile table of contents and store the disc profile table of contents in the computer readable memory in response to the data.

5. A computer readable memory to direct a function performed by a computer, comprising:
   a) a first set of instructions to implement a read lead-in command to read lead-in Sub-channel Q data on a disc within a CD-ROM disc drive, the CD-ROM disc drive lacking a memory to store a disc profile table of contents; and
   b) a second set of instructions to create and store the disc profile table of contents in a memory of the computer in response to receipt of the lead-in Sub-channel Q data.

* * * * *